UNITED STATES PATENT OFFICE.

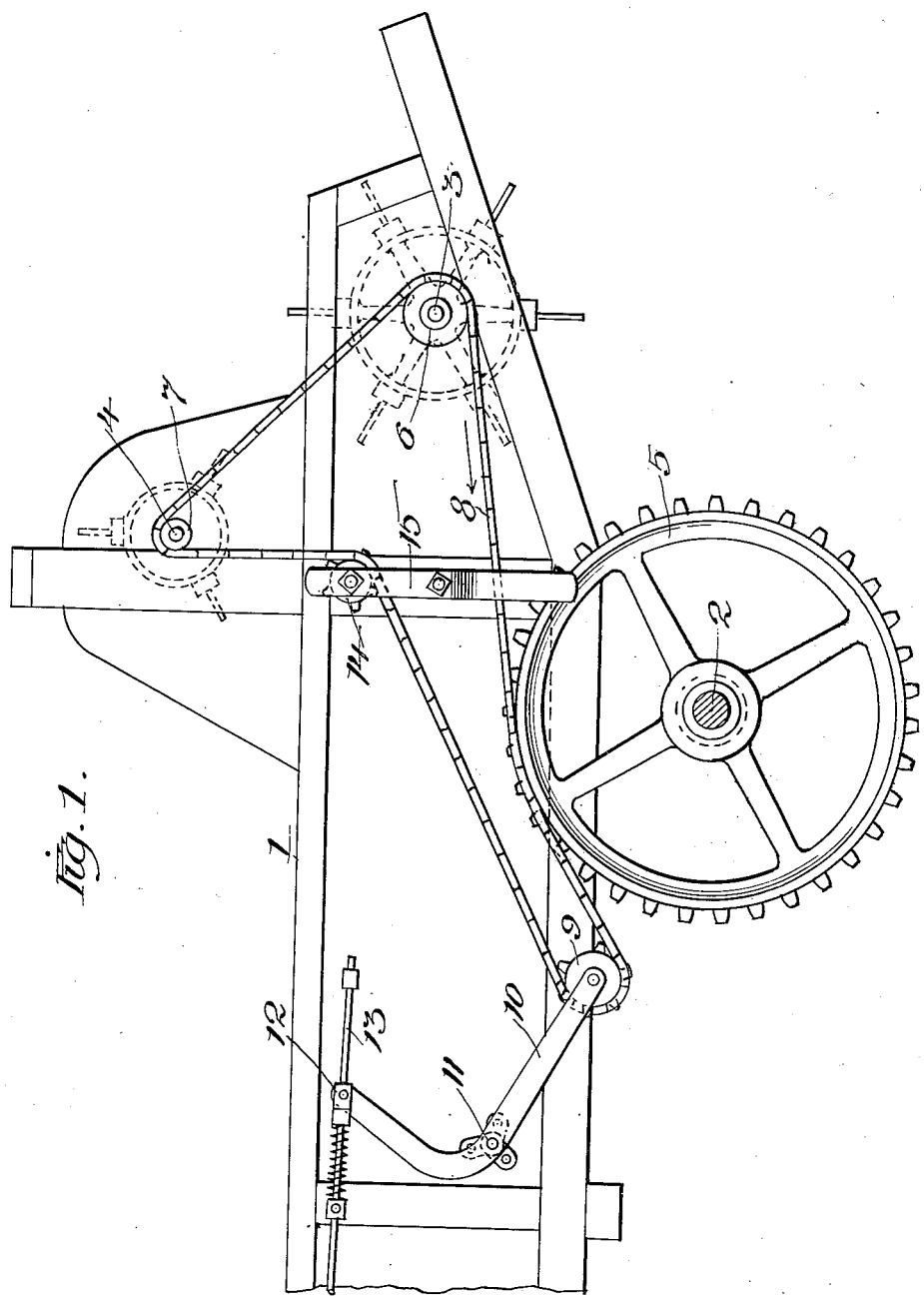

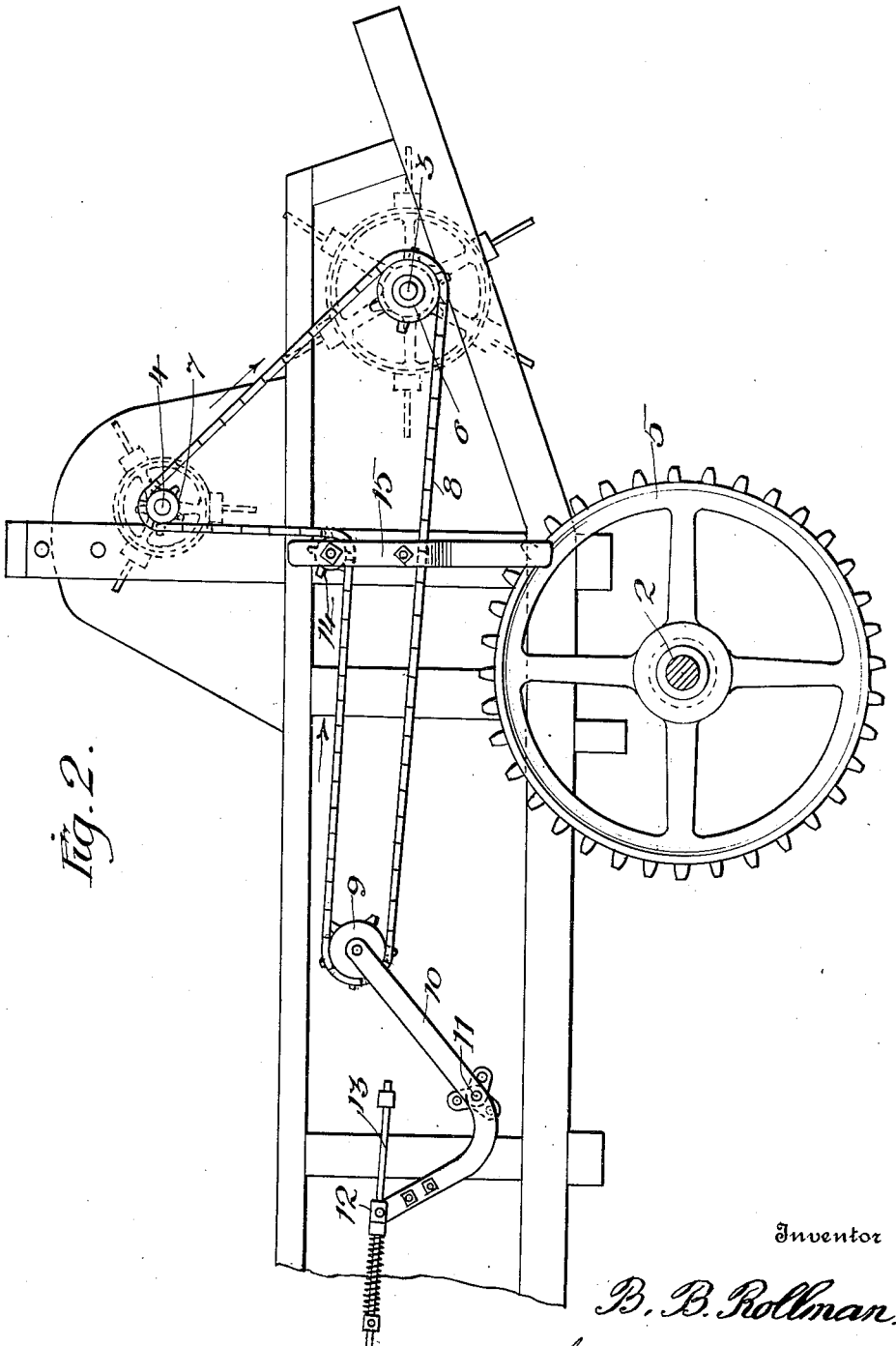

BRUCE B. ROLLMAN, OF PITTSBURGH, PENNSYLVANIA, ASSIGNOR TO NEW IDEA SPREADER COMPANY, OF COLDWATER, OHIO.

GEARING FOR MANURE-SPREADERS.

1,313,116.  Specification of Letters Patent.  Patented Aug. 12, 1919.

Application filed May 7, 1918. Serial No. 233,119.

*To all whom it may concern:*

Be it known that I, BRUCE B. ROLLMAN, a citizen of the United States, residing at Pittsburgh, in the county of Allegheny and State of Pennsylvania, have invented certain new and useful Improvements in Gearings for Manure-Spreaders, of which the following is a specification.

This invention relates to improvements in manure spreaders and more particularly to an improved system of gearing for transmitting motion from the rear axle of the machine to the beater shafts. The machine embodying the present invention is of that type including upper and lower beater cylinders, and a chain which is passed over sprocket gears carried by the shafts of the said beaters and driven from the rear axle of the machine. Ordinarily in such machines power is transmitted from the rear axle, by sprocket gearing, to the lower beater shaft, and the upper beater shaft is driven by sprocket gearing directly from the said lower beater shaft. This arrangement, however, necessitates the employment of two sprocket chains and it is, therefore, one aim of the present invention to provide an arrangement of gearing such as to permit of the use of but a single chain for transmitting motion from the rear axle of the machine to the beater shafts, the chain being movable into and out of mesh with the main drive sprocket which is fixed upon the rear axle of the machine, so that the beater mechanism may be rendered inactive when driving the machine from one field to another.

Another object of the invention is to provide means for maintaining the sprocket chain in taut or substantially taut condition even though it is, as above stated, movable into and out of mesh with the main driving sprocket.

A further object of the invention is to provide gearing for the purpose stated which will be simple in construction and arrangement, not liable to get out of order, and which will be steady and efficient in its operation.

In the accompanying drawings:

Figure 1 is a view in side elevation of the gearing embodying the present invention, the sprocket chain being shown in mesh with the main driving sprocket;

Fig. 2 is a similar view but illustrating the chain out of mesh with the said sprocket.

In the drawings the numeral 1 indicates in general the wagon box or bed which comprises a part of the spreader, 2 indicates the rear axle of the machine, and the numerals 3 and 4 indicate respectively, the lower and upper beater shafts. The numeral 5 indicates a sprocket gear which constitutes the main drive sprocket of the system of gearing and which gear is suitably fixed upon the rear axle 2 so as to turn therewith. Sprocket gears 6 and 7 are fixed respectively upon the shafts 3 and 4, and a sprocket chain 8 is trained over the gears 6 and 7 and is adapted to have its lower stretch moved into or out of mesh with the sprocket gear 5. In order that this adjustment of the chain may be accomplished, the chain is led also about an idle roller or sprocket gear 9 rotatably mounted at one end of an angle lever which is indicated by the numeral 10 and which is mounted for rocking movement as at 11 upon the side of the wagon box 1. The other end of the angle lever 10 is connected in any suitable manner, as indicated by the numeral 12, with a rod 13 designed to be moved rearwardly or forwardly through the operation of a hand lever (not shown). An idle sprocket or roller 14 is mounted in a suitable bracket 15 secured upon the side of the wagon box 1, and the upper stretch of the sprocket chain 8 between the sprocket gears 7 and 9, is passed about the under side of the said idle sprocket 14. It will now be understood that when the rod 13 is moved forwardly, the angle lever 10 will be swung upon its pivot, the idle sprocket 9 being thrown in an upward direction carrying with it the chain 8 until the lower stretch of the chain between the sprockets 6 and 9 will be out of mesh with the sprocket 5. With the chain thus adjusted no motion will, of course, be imparted to the beater shafts. On the other hand, however, when it is desired to set the machine in operation, the rod 13 is moved rearwardly causing the angle lever to be thrown downwardly so as to bring the said lower stretch of the chain 8 into mesh with the upper side of the sprocket 5, as shown in Fig. 1 of the drawings.

It will be evident that due to the provision of the idle sprocket 14, the chain will be maintained in more or less taut condition even when its portion between the sprockets 9 and 14 is thrown upwardly, as in Fig. 2 of the drawings, and there is, therefore, no likelihood of the chain being accidentally disengaged from its sprockets and there is no lost motion when the chain is again brought into mesh with the main drive sprocket.

It will be observed by reference to the drawings that the pivot 11 for the rocking arm 10 is located below and to one side of the idle sprocket 14 and, consequently, as the arm 10 is swung in a downward direction in assuming the position shown in Fig. 1 of the drawings, the sprocket chain will be slightly slackened so that when its lower stretch is brought into mesh with the driving sprocket 5, a greater number of the teeth of the said sprocket 5 will mesh with the chain than if the sprocket chain in the position of the parts illustrated in the said Fig. 1 should be drawn perfectly taut.

Having thus described the invention, what is claimed as new is:

1. In mechanism of the class described, upper and lower gear elements to be driven, a swinging arm, an idler carried thereby, a driving gear element located between the first-mentioned gear elements and the said arm, an idler located above the driving gear element, and a flexible gear element trained about both of the first-mentioned gear elements and first mentioned idler and having its upper stretch passing beneath the last-mentioned idler and its lower stretch extending above the driving gear element and adapted to be moved into and out of engagement therewith by the first-mentioned idler through the swinging of said arm.

2. In mechanism of the class described, upper and lower beater shafts, sprockets carried thereby, a swinging arm, means for angularly adjusting the arm, an idler carried by the arm, a driving sprocket arranged below and between the said idler and the sprocket for the lower beater shaft, an idler located above the driving sprocket, and beneath the sprocket for the upper beater shaft, and a sprocket chain trained about the beater shaft sprockets and about the idler which is carried by the said swinging arm, the upper stretch of the sprocket chain passing beneath the last-mentioned idler and upwardly to and over the sprocket for the upper beater shaft, the lower stretch of the said chain extending above the driving gear element and adapted to be moved into and out of mesh therewith by the first mentioned idler through the swinging adjustment of the said arm.

3. In mechanism of the class described, upper and lower beater shafts, sprockets carried thereby, a swinging arm, means for angularly adjusting the arm, an idler carried by the arm, a driving sprocket arranged below and between the said idler and the sprocket for the lower beater shaft, a relatively fixed idler located above the driving sprocket, and beneath the sprocket for the upper beater shaft, and a sprocket chain trained about the beater shaft sprockets and about the idler which is carried by the said swinging arm, the upper stretch of the sprocket chain passing beneath the last-mentioned idler and upwardly to and over the sprocket for the upper beater shaft, the lower stretch of the said chain extending above the driving gear element and adapted to be moved into and out of mesh therewith by the first mentioned idler through the swinging adjustment of the said arm, the pivot for the arm being located below and to one side of the last-mentioned idler.

In testimony whereof I affix my signature.

BRUCE B. ROLLMAN. [L. S.]